United States Patent [19]
Shima et al.

[11] Patent Number: 5,519,447
[45] Date of Patent: May 21, 1996

[54] WIDE ASPECT TELEVISION RECEIVER INCLUDING A CORRECTING WAVEFORM SIGNAL GENERATOR

[75] Inventors: Juichi Shima; Yoshinori Ishii, both of Nagaokakyo, Japan

[73] Assignee: Mitsubishi Denki Kabushiki Kaisha, Tokyo, Japan

[21] Appl. No.: 328,690

[22] Filed: Oct. 25, 1994

[30] Foreign Application Priority Data

Oct. 28, 1993 [JP] Japan .................................... 5-270498

[51] Int. Cl.⁶ .............................. H04N 3/23; H04N 3/27
[52] U.S. Cl. ......................... 348/556; 348/704; 348/806; 348/807; 315/371
[58] Field of Search .................... 348/458, 173, 348/556, 903, 445, 809, 806, 807, 704, 728, 750, 759, 760; 315/371; H04N 3/23, 3/27, 9/28

[56] References Cited

U.S. PATENT DOCUMENTS

| | | | |
|---|---|---|---|
| 4,763,194 | 8/1988 | Osman ................................... | 348/704 |
| 4,810,939 | 3/1989 | Watanabe et al. ....................... | 315/371 |
| 4,968,919 | 11/1990 | Oliver .................................. | 315/371 |
| 5,034,664 | 7/1991 | Fernsler et al. ......................... | 315/371 |
| 5,136,398 | 8/1992 | Rodriguez-Cavazos et al. ....... | 348/806 |
| 5,253,073 | 10/1993 | Crowley ................................ | 348/760 |

FOREIGN PATENT DOCUMENTS

| | | | | |
|---|---|---|---|---|
| 1123574 | 5/1989 | Japan | .............................. | H04N 3/23 |
| 258980 | 2/1990 | Japan | .............................. | H04N 5/16 |
| 255492 | 2/1990 | Japan | .............................. | H04N 9/69 |
| 2153680 | 6/1990 | Japan | .............................. | H04N 5/14 |
| 396990 | 4/1991 | Japan | .............................. | H04N 5/46 |
| 4184385 | 7/1992 | Japan | .............................. | H04N 3/26 |

Primary Examiner—James J. Groody
Assistant Examiner—Jeffrey S. Murrell

[57] ABSTRACT

A wide aspect television receive corrects variations in the luminance between the center and peripheral portion of the screen that occur due to changing vertical deflection widths by suppressing a video signal amplitude at the top and/or bottom of the screen to be smaller than that at the center of the screen. The wide aspect deflection may also correct over-correction of the lateral pincushion distortion.

18 Claims, 15 Drawing Sheets

UPPER EXPANSION — LOWER CONTRACTION

UPPER CONTRACTION

VERTICAL DEFLECTION CURRENT

UPPER CONTRACTION — LINEAR — LOWER CONTRACTION

ONE VERTICAL SCANNING PERIOD (262.5H)

ONE VERTICAL SCANNING PERIOD

WIDE ASPECT TELEVISION RECEIVER INCLUDING A CORRECTING WAVEFORM SIGNAL GENERATOR

BACKGROUND OF THE INVENTION

1. Field of the Invention

The present invention relates to a wide aspect television receiver to reproduce picture images on a wide screen having an aspect ratio of 16:9 from video signals with aspect ratio of 4:3, for example.

2. Description of the Related Art

FIG. 1 is a block diagram of a part of a wide aspect television receiver of the prior art. A luminance signal/chrominance signal separation circuit; (Y/C SEP) 1 separates a composite video signal generated by frequency multiplexing of a luminance signal Y and a chrominance signal C back into the Y signal and the C signal, outputs the Y signal to a video signal process circuit 2 and to a synchronization signal separation circuit (SYNC SEP) 6, and outputs the C signal to a color signal demodulator 3. The video signal process circuit 2 controls the picture quality, contrast and brightness of the Y signal, and outputs the resultant signal to a matrix circuit 4. The color signal demodulator 3 controls the hue and color density of the C signal to generate a color difference signal and outputs the signal to the matrix circuit 4. The matrix circuit 4 generates primary color signals of red, green and blue (RGB) from the luminance signal Y received from the video signal process circuit 2 and the color difference signal received from the color signal demodulator 3. A CRT 5 correctly directs electron beams, which are controlled according to the RGB signals, on the red, green and blue phosphors provided on a fluorescent screen, and thereby reproduces color images.

The SYNC SEP 6 extracts synchronization signals from the Y signal, and outputs a vertical synchronization signal (V-SYNC) among the synchronization signals to a ramp wave generation circuit 7. The ramp wave generation circuit 7 generates a sawtooth wave synchronized with the V-SYNC and outputs the sawtooth wave to a vertical drive circuit (V-DRIVE). The V-DRIVE 8 amplifies the voltage of the sawtooth wave and shapes the waveform, then outputs the wave to a vertical output circuit (V-OUT) 9. The V-OUT 9 amplifies the power of the sawtooth wave and supplies the sawtooth current to a vertical deflection coil 10 which deflects the electron beams vertically on the screen. A vertical deflection linearity correction circuit 13 is provided in a negative feedback loop where the deflection current is negatively fed back to the V-DRIVE 8 in order to correct the linearity of the sawtooth current, and corrects the sawtooth current to be uniformly linear or partially nonlinear, depending on the aspect ratio of the screen where the pictures are to be displayed. Description of circuits of the horizontal deflection system will be omitted here.

The vertical deflection linearity correction circuit 13 is composed of two pairs of Feedback resistances 13a, 13a' resistance value: 13a >13a') and feedback resistances 13b, 13b' (resistance value: 13b>13b'), a switching circuit 13c to switch over the Feedback resistances 13a and 13a' according to the aspect ratio of the screen whereon to reproduce pictures, and a switching circuit 13d to switch over the feedback resistances 13b and 13b' according to the aspect ratio of the screen. The feedback resistances 113a, 13a' are connected in parallel to the positive lead of a coupling capacitor 11 of which a negative lead is grounded via a feedback resistance 12, while the feedback resistances 13b, 13b' are connected in parallel to a lead wire which connects the negative lead of the coupling capacitor 11 and the Feedback resistance 12, via a coupling capacitor 13e. "Direct current component DC+alternate current component AC" is negatively fed back from the positive lead of the coupling capacitor 11, and the alternate component AC is negatively fed back from the negative lead of the coupling capacitor 11, via the vertical deflection linearity correction circuit 13 to the V-DRIVE 8.

By the switching circuits 13c, 13d of the vertical deflection linearity correction circuit 13 switching over the feedback resistances 13a, 13a' and the feedback resistances 13b, 13b', respectively, a raster is formed by a sawtooth current uniformly linear over the entire screen in the vertical direction when reproducing pictures on an ordinary screen, or a raster contracted air the top and bottom thereof is formed while maintaining the aspect ratio (circularity) of the ordinary screen at the center of the screen as shown in FIG. 2, by a linear sawtooth current for the center of the screen and by a nonlinear sawtooth current for the top and bottom of the screen when reproducing pictures on a wide screen.

Now the operation of switching over ordinary screen reproduction and wide screen reproduction by means of the vertical deflection linearity correction circuit 13 will be described below. Because the vertical deflection linearity correction circuit 13 is arranged in the negative feedback loop of a negative feedback amplifier, an increase in the amount of feedback leads to a smaller outpost and a decrease in the amount of feedback leads to a greater output. By making use of this characteristic, the switching circuit 13c switches to the feedback resistance 13a' of a lower resistance value when reproducing pictures on a wide screen. Consequently, an inversely parabolic output as shown in FIG. 3A is obtained because higher parabolic voltage in one vertical scanning period is fed back than that in ordinary screen reproduction. Therefore, such a vertical deflection current flows in the vertical deflection coil 10 as to form a raster expanded at the top and contracted at the bottom.

The switching circuit 13d also switches over to the feedback resistance 13b' of a smaller resistance value. At this time, because more differentiated sawtooth wave obtained in the coupling capacitor 13e is fed back than that in ordinary screen reproduction, the output is smaller only at the start as shown in FIG. 3B so that such a vertical deflection current flows in the vertical deflection coil 10 to form a raster contracted at the top. When these two outputs are synthesized, vertical deflection currents of portions corresponding to the top and bottom of the screen are nonlinear as shown in FIG. 3C, assuming that there is no deflection distortion, a raster having good linearity at the center of the screen and contracted at the top and bottom thereof is formed as shown in FIG. 2.

In ordinary screen reproduction wherein a linear vertical deflection current over the entire screen is supplied, the switching circuit 13c and the switching circuit 13d switch over to the feedback resistance 13a and the feedback resistance 13b which have higher resistance value, respectively. Output of the vertical deflection linearity correction circuit 13 becomes a linear sawtooth wave as indicated by a broken line in FIG. 3C, so that a raster having good linearity over the entire screen is formed.

At the same time, the vertical deflection width is also switched so that the same over scan in the vertical direction as shown in FIG. 4 can be obtained both in ordinary screen reproduction and in wide screen reproduction.

With such a constitution as described above, displaying a picture of aspect ratio 4:3 on a wide screen of aspect ratio 16:9 hardly causes unusual impression of vertical contraction.

However, since the wide aspect television receiver of the prior art displays a picture of aspect ratio 4:3 on a screen of aspect ratio 16:9 by contracting the raster at the top and bottom of the screen while maintaining circularity (aspect ratio) at the center of the CRT screen, only by means of the vertical deflection linearity correction circuit 13 which deals with the linearity of vertical deflection, horizontal scan lines are denser at the top and bottom where the raster is compressed, resulting in higher luminance in these portions of the screen.

Besides, the pincushion distortion on the right and left of the top and bottom of the screen where the raster being contracted is not properly corrected because when the raster is contracted only at the top and bottom after simply broadening the vertical deflection width wider than that in ordinary screen reproduction, contraction at the top and bottom results in a relatively greater influence of the horizontal deflection magnetic field on the top and bottom portions of the screen.

Especially, when using a CRT of high-definition where the pitch of the phosphor stripes on the CRT fluorescent screen or the corresponding pitch is equal all over the screen, the unevenness in luminance at the top and bottom of the screen as described above is conspicuous.

SUMMARY OF THE INVENTION

The present invention has been devised in order to solve the problems described above. It is an object of the invention to provide a wide aspect television receiver capable of correcting the luminance of the picture at the top and bottom of the screen where the luminance becomes higher because the scan lines are denser due to contraction of the raster at the top and bottom, when an ordinary screen picture is expanded and reproduced on a wide screen.

It is another object of the invention to provide a wide aspect television receiver capable of properly correcting the pincushion distortion on the right and left, portions of the top and bottom of the screen where the raster is contracted when an ordinary screen picture is expanded and reproduced on a wide screen by contracting the raster at the top and bottom of the screen.

The above and further objects and features of the invention will more fully be apparent from the following detailed description with accompanying drawings.

BRIEF DESCRIPTION OF THE DRAWINGS

FIG. 12A is a block diagram of pincushion distortion correction circuit of the wide aspect television receiver of the invention;

DESCRIPTION OF THE PREFERRED EMBODIMENTS

Now the invention will be described with reference to the accompanying drawings.

Embodiment 1

Figure 1:
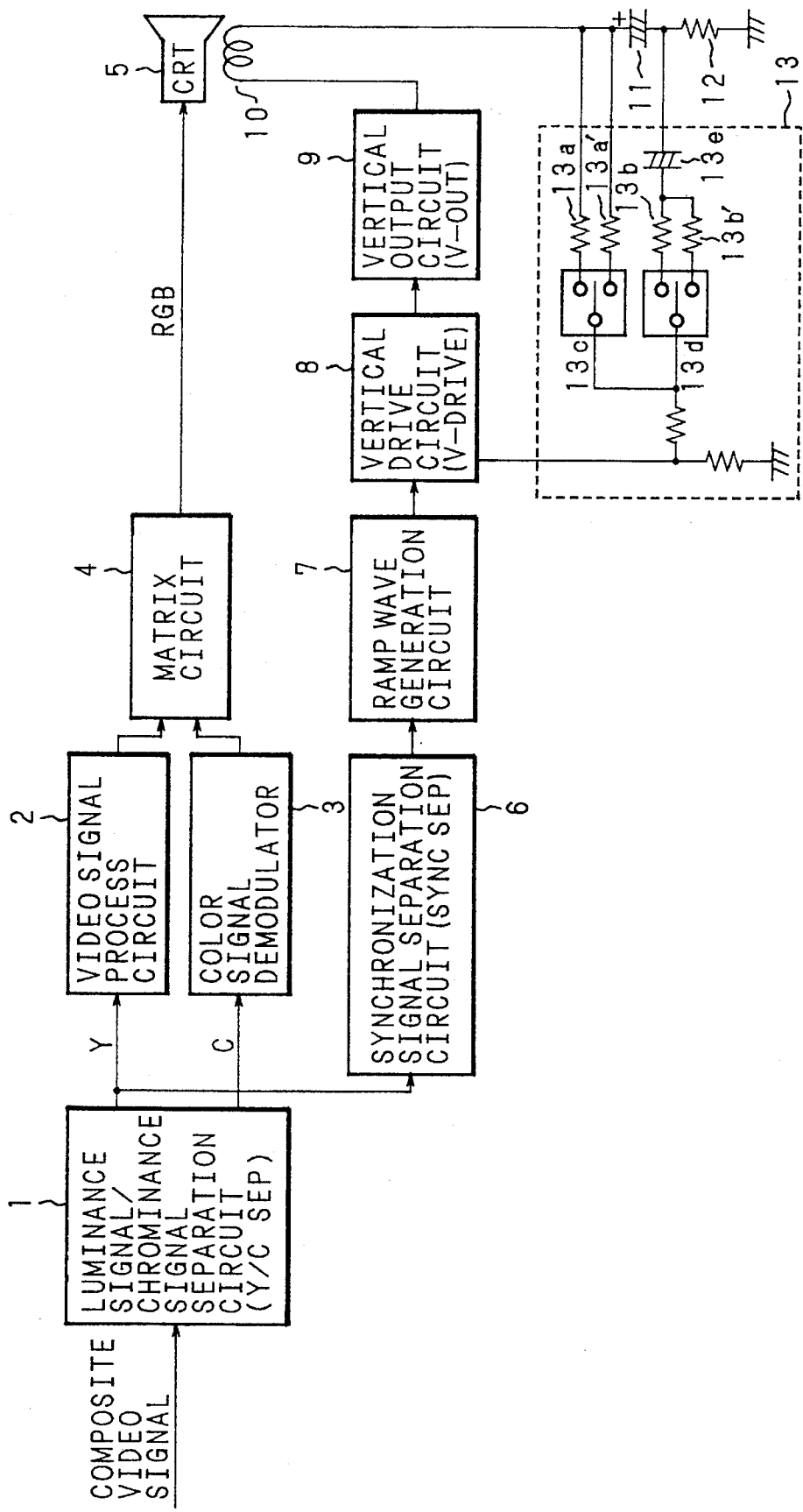
FIG. 1 is a block diagram of a wide aspect television receiver of the prior art.
Figure 2:
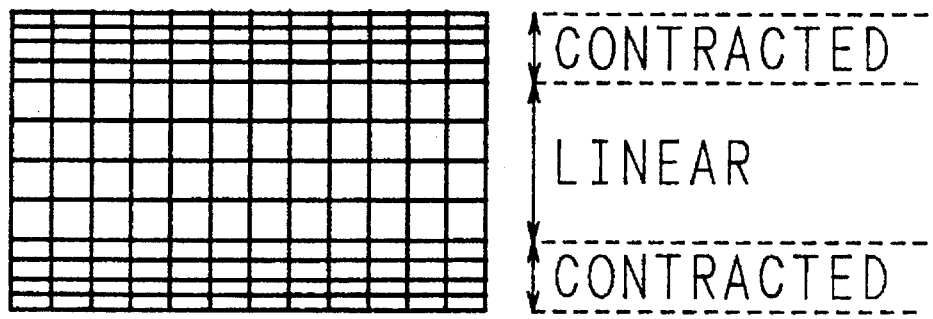
FIG. 2 shows a raster pattern without any deflection distortion in wide screen reproduction.
Figure 3A:
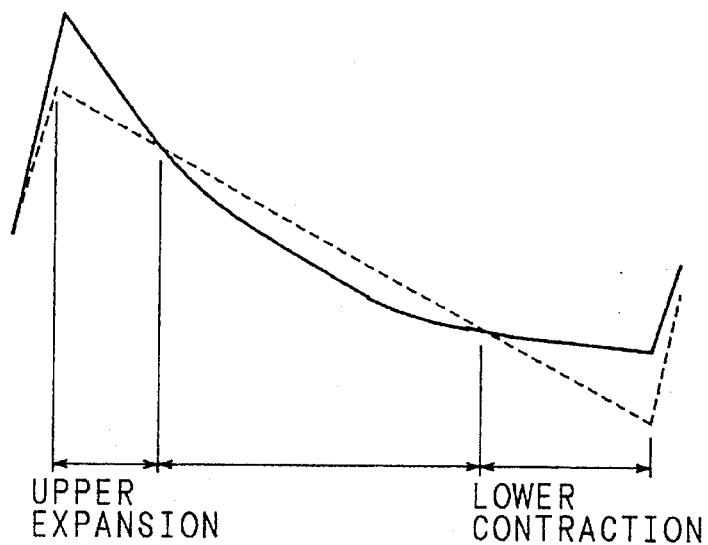
FIG. 3A is a waveform diagram of a vertical deflection current passed through a feedback resistance of a lower resistance value in a first switching circuit 13c.
Figure 3B:
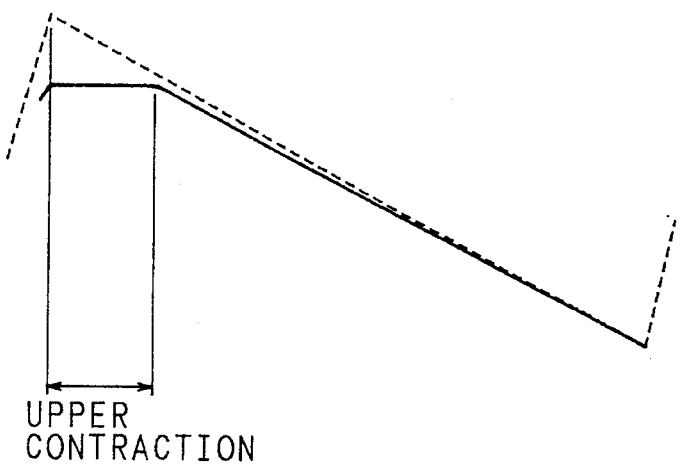
FIG. 3B is a waveform diagram of a vertical deflection current passed through a feedback resistance of a lower resistance value in a second switching circuit 13.
Figure 3C:
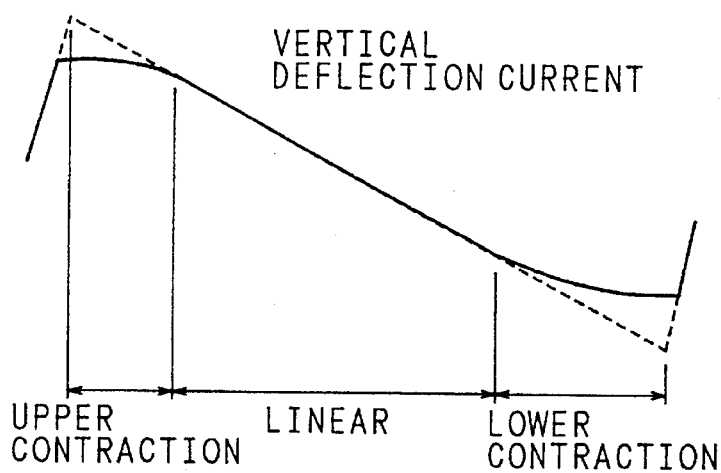
FIG. 3C is a waveform diagram of a vertical deflection current outputted from a vertical deflection linearity correction circuit after synthesizing the waveforms shown in FIG. 3A and FIG. 3B.
Figure 4:
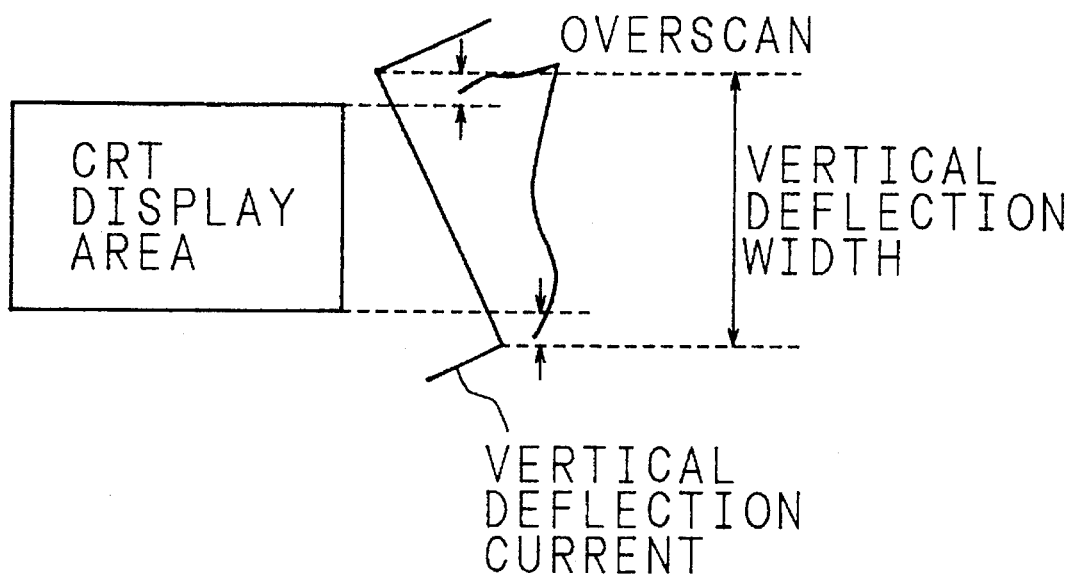
FIG. 4 is a diagram explanatory of overscan in the vertical direction.
Figure 5:
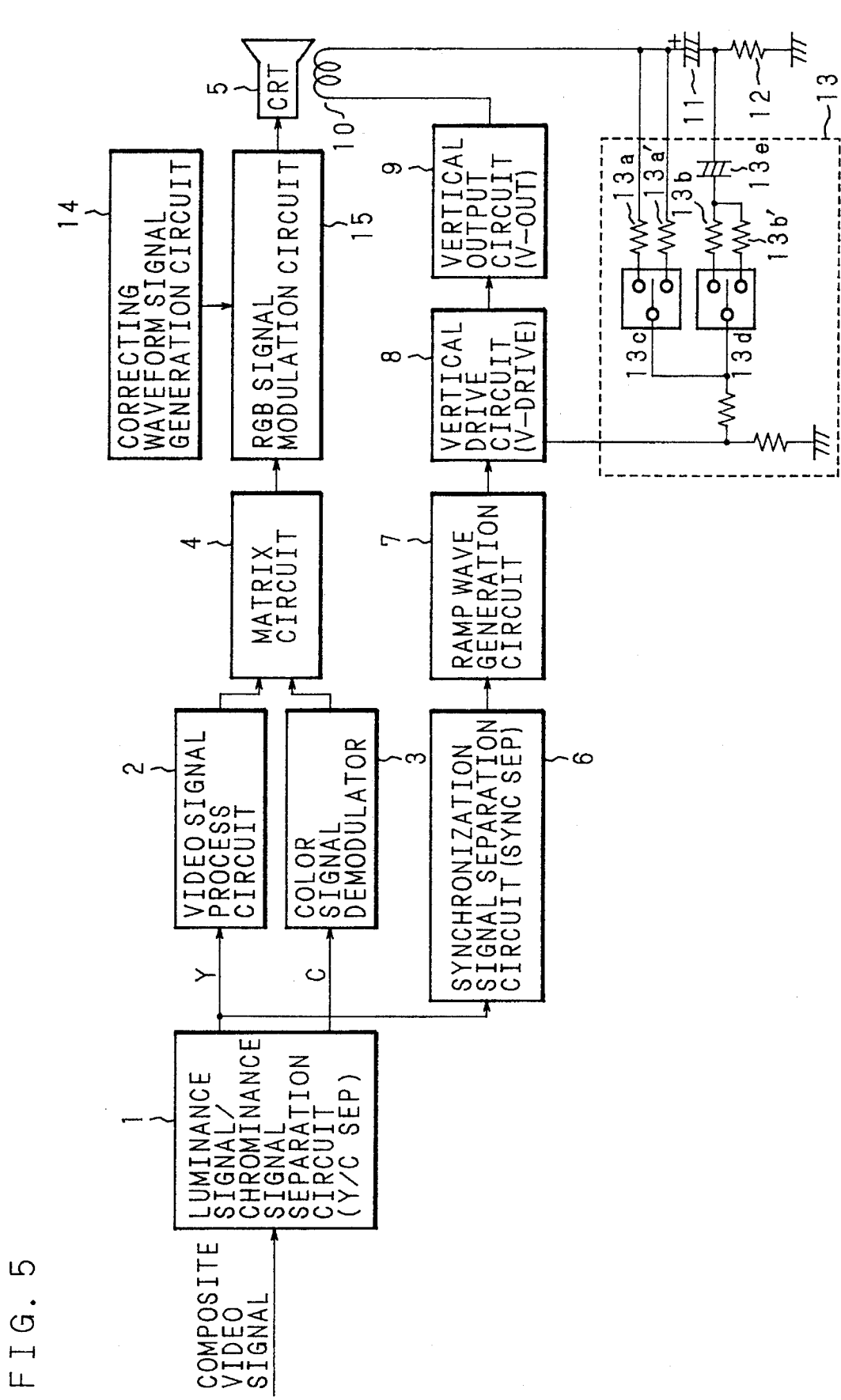
FIG. 5 is a block diagram of the first embodiment of the wide aspect television receiver of the invention.

FIG. 5 is a block diagram of a part of the wide aspect television receiver of the invention. A luminance signal/ chrominance signal separation circuit (Y/C SEP) 1 separates a composite video signal generated by frequency multiplexing of a luminance signal Y and a chrominance signal C back into the Y signal and the C signal, outputs the Y signal to a video signal process circuit 2 and to a synchronization signal separation circuit (SYNC SEP) 6, and outputs the C signal to a color signal demodulator 3. The video signal process circuit 2 controls the picture quality, contrast and brightness of the Y signal, and outputs the resultant signal to a matrix circuit 4. The color signal demodulator 3 controls the hue and color density of the C signal to generate a color difference signal and outputs the signal to the matrix circuit 4. The matrix circuit 4 generates primary color signals of red, green and blue (RGB) from the luminance signal Y received from the video signal process circuit 2 and the color difference signal received from the color signal demodulator 3, and outputs the primary color signals to an RGB signal modulation circuit 15.

A correcting waveform signal generation circuit 14 generates a wave which is a parabolic in one vertical scanning period to correct luminance difference on the screen due to the difference in density of horizontal scan lines in wide screen reproduction by changing a vertical deflection current to be partially nonlinear in the vertical deflection circuit system, and outputs the wave to the RGB signal modulation circuit 15. The RGB signal modulation circuit 15 amplitude-modulates the RGB signal in one vertical scanning period by the parabolic wave supplied from the correcting waveform signal generation circuit 14, and suppresses amplitudes of the RGB signals corresponding to the top and bottom of the screen within a specified level, thereby decreasing the luminance at the top and bottom of the screen. A CRT 5 reproduces color images by correctly directing electron beams controlled by the RGB signals which are modulated in the RGB signal modulation circuit 15, on the red, green and blue phosphors on the fluorescent screen.

The SYNC SEP 6 extracts synchronization signals from the Y signal, and outputs a vertical synchronization signal (V-SYNC) among the synchronization signals to a ramp wave generation circuit 7. The vamp wave generation circuit 7 generates a sawtooth wave synchronized with the V-SYNC and outputs the sawtooth wave to a vertical drive circuit (V-DRIVE). The V-DRIVE 8 amplifies the voltage of the sawtooth wave and shapes the waveform, then outputs the wave to a vertical output circuit (V-OUT) 9. The V-OUT 9 amplifies the power of the sawtooth wave and supplies the sawtooth current to a vertical deflection coil 10 which deflects the electron beams vertically on the screen. A vertical deflection linearity correction circuit 13 is provided in a negative feedback loop where the deflection current is negatively fed back to the V-DRIVE 8 in order to correct the linearity of the sawtooth current, and corrects the sawtooth current to be uniformly linear or partially nonlinear, depending on the aspect ratio of the screen where the pictures are to be displayed. Description of circuits of the horizontal deflection system will be omitted here.

The vertical deflection linearity correction circuit 13 is composed of two pairs of feedback resistances 13a, 13a' (resistance value: 13a>13a') and feedback resistances 13b, 13b' (resistance value: 13b>13b'), a switching circuit 13c to switch over the feedback resistances 13a and 13a' according to the aspect ratio of the screen whereon to reproduce pictures, and a switching circuit 13d to switch over the feedback resistances 13b and 13b' according to the aspect ratio of the screen. The feedback resistances 13a, 13a' are connected in parallel to the positive lead of a coupling capacitor 11 of which negative lead is grounded via a feedback resistance 12, while the feedback resistances 13b, 13b' are connected in parallel to a lead wire which connects the negative lead of the coupling capacitor 11 and the feedback resistance 12, via a coupling capacitor 13e. "Direct current component DC+alternate current component AC" is negatively fed back from the positive lead of the coupling capacitor 11, and the alternate component AC is negatively fed back from the negative lead of the coupling capacitor 11, via the vertical deflection linearity correction circuit 13 to the V-DRIVE 8.

Figure 6:
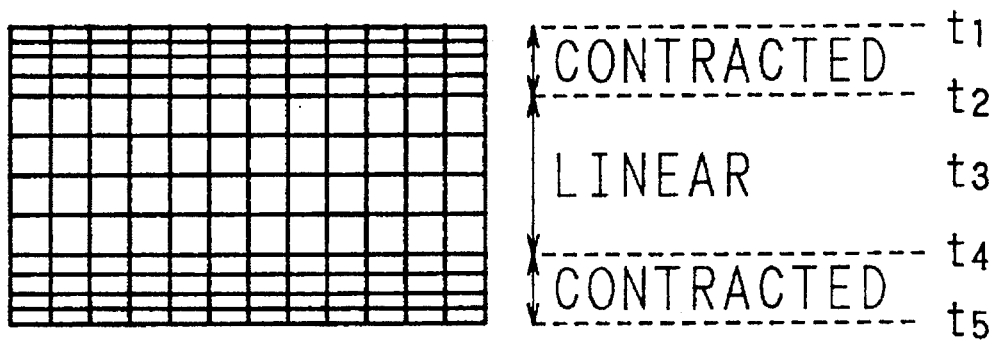
FIG. 6 shows a raster pattern without any deflection distortion in wide screen reproduction.

By the switching circuits 13c, 13d of the vertical deflection linearity correction circuit 13 switching over the feedback resistances 13a, 13a' and the feedback resistances 13b, 13b', respectively, a raster is formed by a sawtooth current uniformly linear over the entire screen in the vertical direction when reproducing pictures on an ordinary screens or a raster contracted at the top and bottom thereof is formed while maintaining the aspect ratio (circularity) of the ordinary screen at the center of the screen as shown in FIG. 6, by a linear sawtooth current for the center of the screen and by a nonlinear sawtooth current for the top and bottom of the screen when reproducing pictures on a wide screen.

Figure 7A:
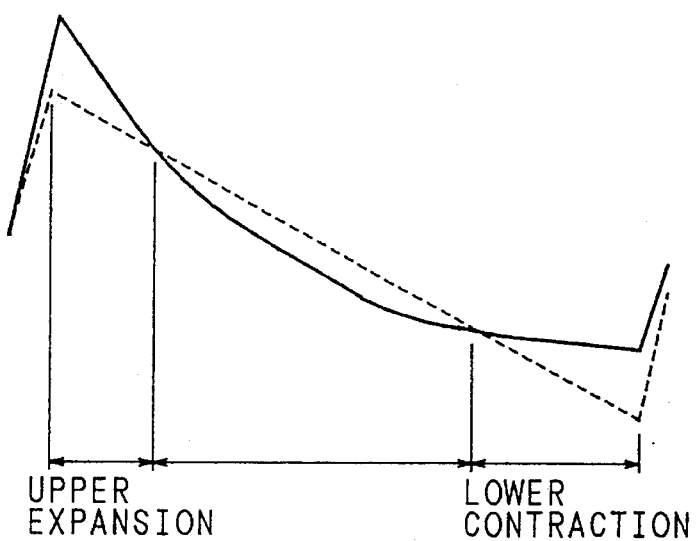
FIG. 7A is a waveform diagram of a vertical deflection current passed through the feedback resistance of a lower resistance value in the first switching circuit 13c.
Figure 7B:
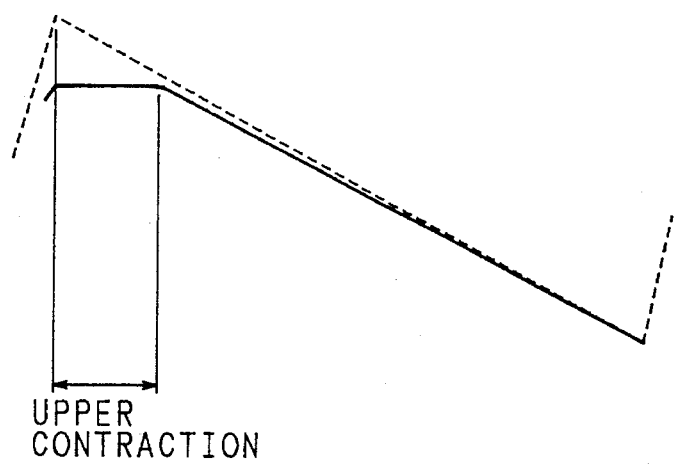
FIG. 7B is a waveform diagram of a vertical deflection current passed through the feedback resistance of a lower resistance value in the second switching circuit 13c.

Now the operation of switching over ordinary screen reproduction and wide screen reproduction by means of the vertical deflection linearity correction circuit 13 will be described below. Because the vertical deflection linearity correction circuit 13 is arranged in the negative feedback loop of a negative feedback amplifier, an increase in the amount of feedback leads to a smaller output and a decrease in the amount of feedback leads to a greater output. By making use of this characteristics, the switching circuit 13c switches to the feedback resistance 13a' of a lower resistance value when reproducing pictures on a wide screen. Consequently, an inversely parabolic output as shown in FIG. 7A is obtained because higher parabolic voltage in one vertical scanning period is fed back than that in ordinary screen reproduction. Therefore, such a vertical deflection current flows in the vertical deflection coil 10 as to form a raster expanded at the top and contracted at the bottom.

Figure 7C:
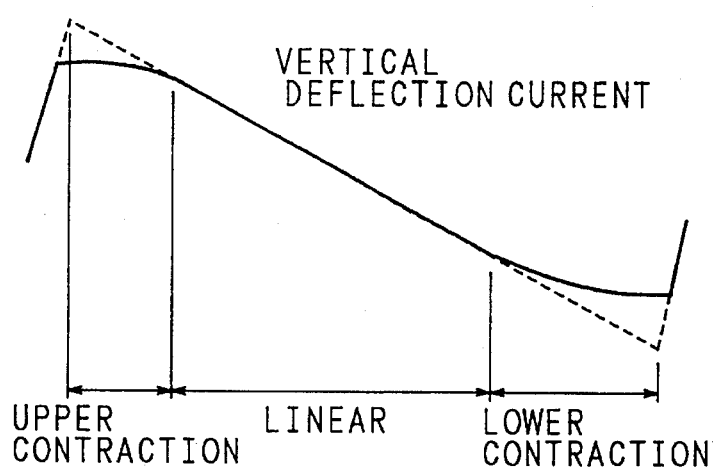
FIG. 7C is a waveform diagram of a vertical deflection current outputted from the vertical deflection linearity correction circuit after synthesizing the waveforms shown in FIG. 7A and FIG. 7B.

The switching circuit 13d also switches over to the feedback resistance 13b' of a smaller resistance value. At this time, because more differentiated sawtooth wave obtained in the coupling capacitor 13e is fed back than that in ordinary screen reproduction, the output is smaller only at the start as shown in FIG. ? B so that such a vertical deflection current flows in the vertical deflection coil 10 to form a raster contracted at the top. When these two outputs are synthesized, vertical deflection currents of portions corresponding to the top and bottom of the screen are nonlinear as shown in FIG. 7C, assuming that there is no deflection distortion, a raster having good linearity at the center of the screen and contracted at the top and bottom thereof is formed as shown in FIG. 6.

In ordinary screen reproduction wherein a linear vertical deflection current over the entire screen is supplied, the switching circuit 13c and the switching circuit 13d switch over to the feedback resistance 13a and the feedback resistance 13b which have higher resistance value, respectively. Output of the vertical deflection linearity correction circuit 13 becomes a linear sawtooth wave as indicated by a broken line in FIG. 7C, so that a raster having good linearity over the entire screen is formed.

Figure 8A:
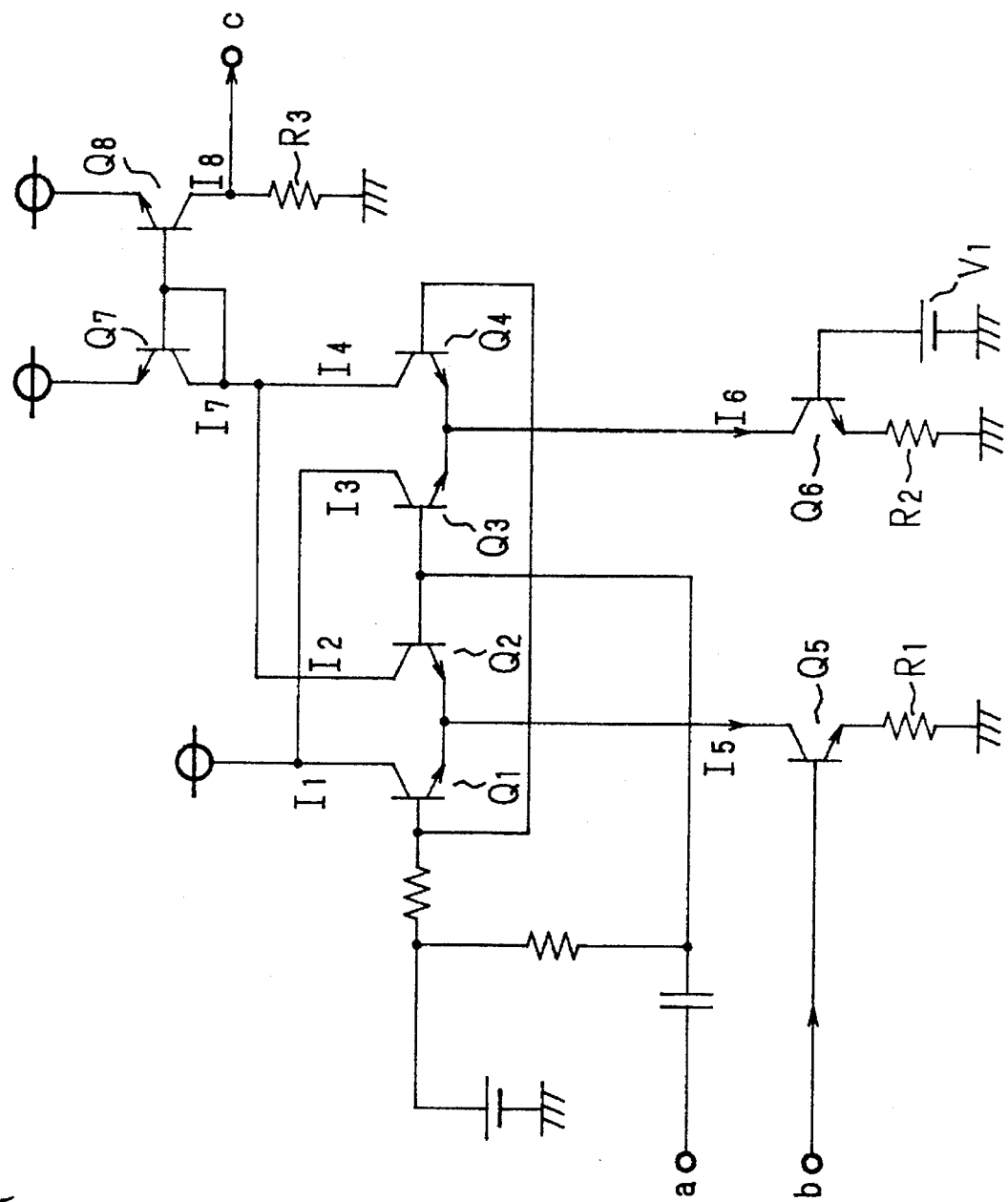
FIG. 8A is a circuit diagram of an RGB signal modulation circuit of the wide aspect television receiver shown in FIG. 5.
Figure 8B:
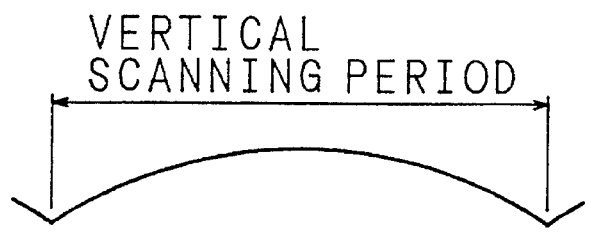
FIG. 8B shows an embodiment of the correcting waveform signal which is an input to the RGB signal modulator circuit shown in FIG. 8A.
Figure 8C:
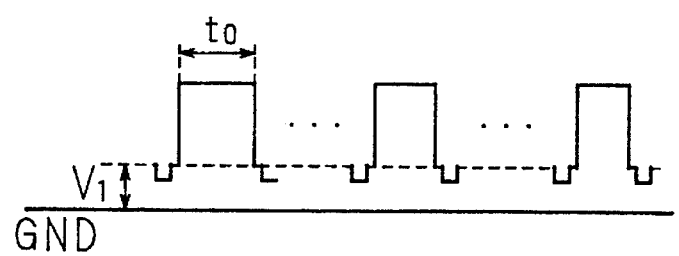
FIG. 8C shows the RGB signal which is an input to the RGB signal modulator circuit shown in FIG. 8A.
Figure 8D:
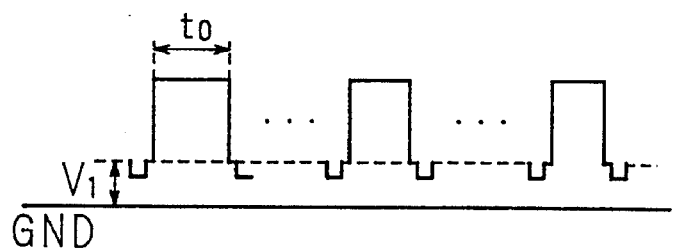
FIG. 8D shows the RGB signal without correction output from the RGB signal modulator circuit shown in FIG. 8A.
Figure 8E:
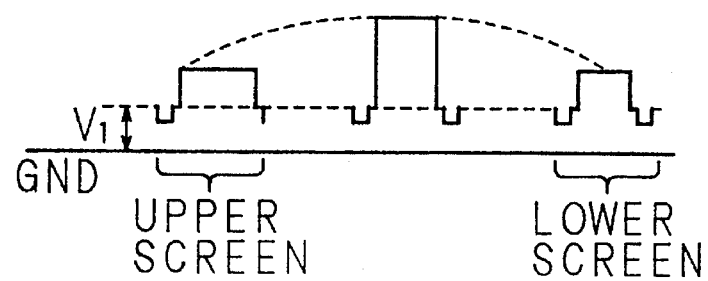
FIG. 8E shows the corrected RGB signal output from the RGB signal modulator circuit shown in FIG. 8A.

The correcting waveform signal generation circuit generates the signal being parabolic in one vertical scanning period to correct the difference in luminance on the screen which is caused when the raster is simply contracted at the top and bottom by using only the vertical deflection linearity correction circuit 13 in wide screen reproduction (FIG. 8B). Then the correcting waveform signal from the correcting waveform signal generation circuit 14 acts upon the RGB signal modulation circuit 15 to amplitude-modulate the video signal (FIG. 8C) in one vertical scanning period. As a result, amplitudes of the RGB signals corresponding to the top and bottom of the screen are suppressed within a specified level as shown in FIG. 8E.

FIG. 8A shows a doubly-balanced modulator circuit as an example of a circuit for amplitude modulation. When the parabolic signal shown in FIG. 8B is input to an input terminal a and the RGB signals shown in FIG. 8C are input to an input terminal b, this circuit outputs such RGB signals from an input terminal c that have been wholly amplitude-modulated with the parabolic waveform as indicated by dotted line in FIG. 8E over the entire period of one vertical scanning period.

Transistors $Q_1$ and $Q_2$ (emitter-coupled) and transistors $Q_3$ and $Q_4$ (emitter-coupled) constitute a differential amplifier. The collectors of the transistors $Q_5$ and $Q_6$ are connected to the emitters of the transistors $Q_1$, $Q_2$ and of the transistors $Q_3$, $Q_4$, respectively, to constitute current sources for the transistor pair $Q_1$, $Q_2$ and the transistor pair $Q_3$, $Q_4$, respectively. Resistance values of emitter resistances $R_1$ and $R_2$ of the transistors $Q_5$ and $Q_6$, which determine the magnitudes of the collector currents $I_5$, $I_6$, of the transistors $Q_5$ and $Q_6$, respectively, are set to be equal. The parabolic voltage which is input through the input terminal a is impressed to the bases of the transistors $Q_2$ and $Q_3$. The R (or G or B) signal which is input through the input terminal b is impressed to the base of the transistor $Q_5$. Because the base of the transistor $Q_6$ is biased with a constant voltage $V_1$ equal to the pedestal level which is input to the input terminal b, the transistor $Q_6$ constitutes a constant current circuit so that the collector of the transistor $Q_6$ draws a constant current $I_6$. The collectors of the transistors $Q_2$ and $Q_3$ are connected to the bases of transistors $Q_7$ and $Q_8$ and the collector of the transistor $Q_7$. The collector of the transistor $Q_8$ is connected to the ground potential via a resistance $R_3$ and to the output terminal c. The transistors $Q_7$ and $Q_8$ constitute a Miller current circuit, while collector currents $I_7$ and $I_8$ of the transistors $Q_7$ and $Q_8$ are nearly equal to each other ($I_7=I_8$).

Now the basic operation of the circuit shown in FIG. 8A will be described below. When the correcting signal of the parabolic voltage shown in FIG. 8B is not input to the input terminal a, each pair of the transistors $Q_1$ and $Q_2$ and the transistors $Q_3$ and $Q_4$ which constitute the differential amplifier draws the same collector currents $I_1$, $I_2$ and $I_3$, $I_4$ as follows.

$$I_1=I_2=I_5 \cdot \tfrac{1}{2} \qquad (1)$$

$$I_3=I_4=I_6 \cdot \tfrac{1}{2} \qquad (2)$$

$$I_8=I_7=I_2+I_4=I_5 \cdot \tfrac{1}{2} \qquad (3)$$

When $I_6$ is a constant current and the voltage of the input RGB signal to the terminal b has the waveform as shown in FIG. 8C, with the double line indicating the pedstal level, the collector current $I_5$ of the transistor $Q_5$ becomes greater than the collector current $I_6$ of the transistor $Q_6$ in a video period $t_0$. Consequently, the collector current $I_8$ of the transistor $Q_2$ represented by equation (3) increases in the video period $t_0$. In the case that the resistance value of the resistance $R_3$ connected between the collector of the transistor $Q_8$ and the ground level is set to a specified value, a signal of the same waveform is output from the terminal c as that of the signal at the terminal b in the video period $t_0$. Moreover, the signal level becomes nearly the same as that of the signal at the terminal b outside the video period $t_0$ (FIG. 8D).

On the other hand, in a situation similar to that described previously wherein the collector current $I_6$ of the transistor $Q_6$ is a constant current, and the voltage of the input signal to the terminal b has the waveform as shown in FIG. 8C while the collector current $I_5$ of the transistor $Q_5$ becomes greater than collector current $I_6$ of the transistor $Q_6$ in the video period $t_0$, the following inequality holds in case the positive parabolic voltage as shown in FIG. 8B is applied to the terminal a as the correcting signal.

$$I_5 > I_6 \qquad (4)$$

namely $$I_5 = I_6 + \Delta I_0 > I_6 \qquad (5)$$

where $\Delta I_0$ represents an increment in the current of the transistor $Q_5$ arising because the base voltage of the transistor $Q_5$ is higher than the base voltage ($V_1$=pedestal voltage) of the transistor $Q_6$.

The collector currents $I_2$ and $I_3$ of the transistors $Q_2$ and $Q_3$ are greater than the collector currents $I_1$ and $I_4$ of the transistors $Q_1$ and $Q_4$, respectively, because of the positive parabolic voltage applied to the terminal a,.

As indicated by equation (3), the absolute value $|\Delta I_2|$ of the increment in the collector current $I_2$ of the transistor $Q_2$ is greater than the absolute value $|\Delta I_4|$ of the decrement in the collector current $I_4$ of the transistor $Q_4$ because $I_5 > I_6$ in the period $t_0$.

$$|\Delta I_2| > |\Delta I_4| \qquad (6)$$

From these formulas, the collector current $I_7$ of the transistor $Q_7$ can be expressed as follows.

$$\begin{aligned} I_7 &= \text{collector current of transistor } Q_2 + \text{collector current of transistor } Q_4 \\ &= \{(I_5 \cdot 1/2 + \Delta I_2)\} + \{(I_6 \cdot 1/2) - \Delta I_4\} \\ &= (I_5 \cdot 1/2 + (I_6 \cdot 1/2) + (\Delta I_2 - \Delta I_4)) \end{aligned} \qquad (7)$$

From comparing equation (7) and equation (3), the collector current of the transistor $Q_7$ increases by $\Delta I_2 - \Delta I_4$ (>0) because of the positive parabolic voltage which is input from the terminal a.

Moreover, because the increment of current ($\Delta I_2 - \Delta I_4$) increases as the positive parabolic voltage which is input from the terminal a increases an output signal voltage given at the terminal c increases. This means that the output signal voltage given at the terminal c is amplitude-modulated by the parabolic voltage input from the terminal a in the video period $t_0$. As a result, output signal of the waveform shown in FIG. 8E appears across the resistance $R_3$ connected between the collector of the transistor $Q_8$ and the ground.

As is apparent from the signal waveform shown in FIG. 8E, amplitude of the video signal corresponding to the top or bottom of the screen in the video period $t_0$ decreases compared to that of the middle of the screen. Besides, the amplitude change during one vertical scanning period is similar, as indicated by the dotted curve in FIG. 8E, to the parabolic voltage waveform (FIG. 8B) which is input from the terminal a.

In this embodiment, though a so-called negative feedback amplifier which has specified frequency characteristics by arranging the vertical deflection linearity correction circuit 13 in the feedback loop of the vertical drive circuit is applied to contract the top and bottom of the raster in the vertical direction, a reference wave contracted at the top and bottom may also be used in the stage of generating the ramp wave in the ramp wave generation circuit 7.

In Embodiment 1, though the correcting waveform signal is generated in the correcting waveform signal generation circuit 14, a parabolic wave just appeared on the positive side of the coupling capacitor 11 may also be used.

Embodiment 2

Figure 9:
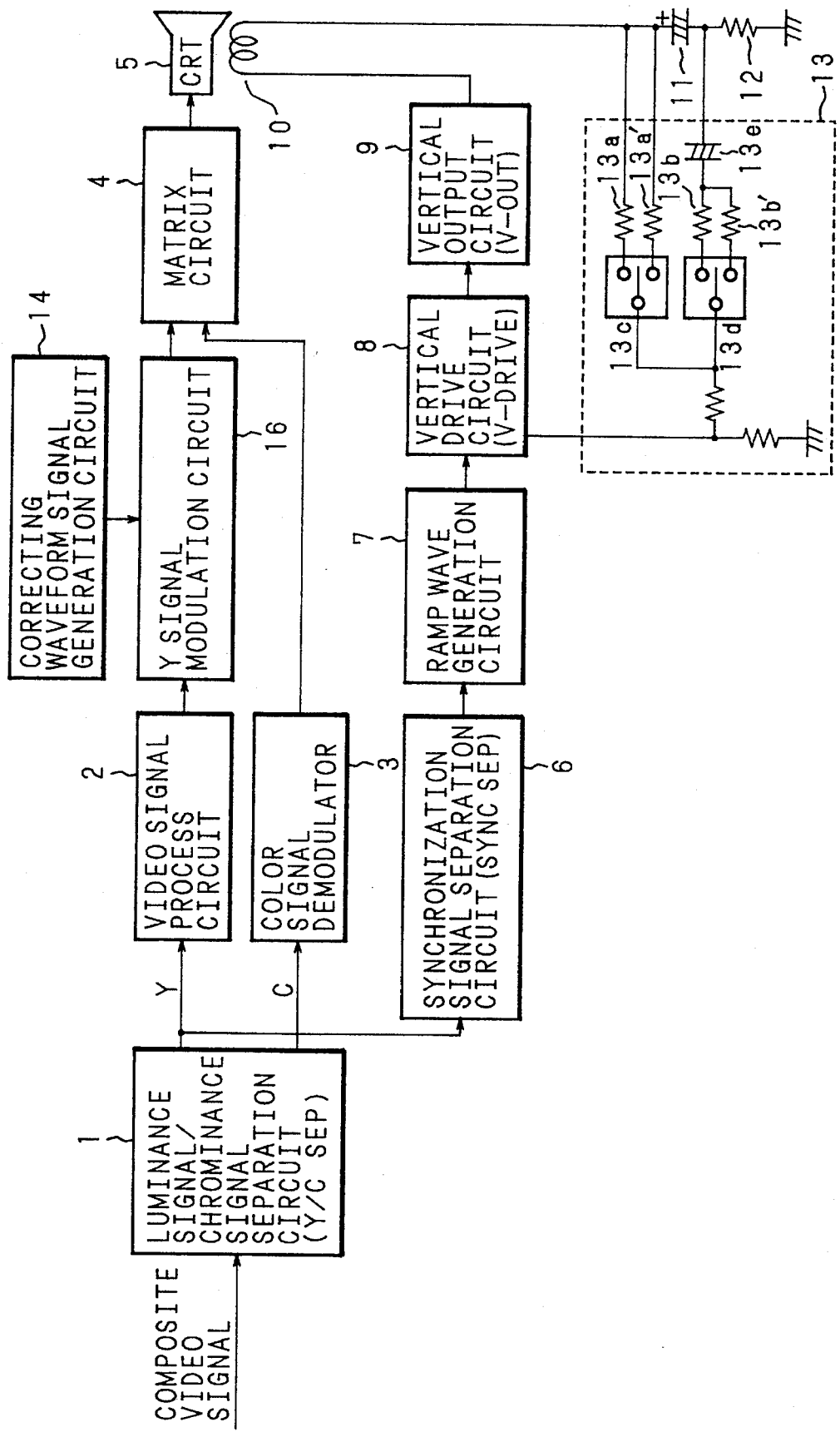
FIG. 9 is a block diagram of the second embodiment of the wide aspect television receiver of the invention.

FIG. 9 is a block diagram of another embodiment of the wide aspect television receiver of the invention. Components identical with those of Embodiment 1 are denoted by the same numerals and description thereof will be omitted. Although the RGB signals are corrected in Embodiment 1, the Y signal (luminance signal), for example, is corrected for the sake of simplification in this embodiment. This embodiment is different from Embodiment 1 shown in FIG. 5 in that the parabolic waveform signal from the correcting waveform signal generation circuit. 14 acts on the Y signal modulation circuit 16 instead of the RGB signal modulation circuit 15 shown in FIG. 5 as in Embodiment 1.

Correction may also be applied by superimposing the correcting wave on a DC control terminal as to DC-control the contrast by means of a video signal processing IC.

Embodiment 3

Another embodiment of the correcting waveform signal generation circuit 14 required to realize the wide aspect television receiver of the invention will now be described below.

Figure 10:
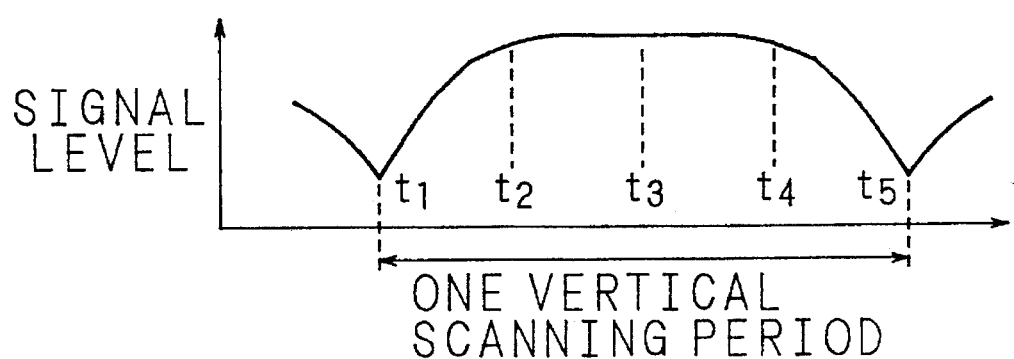
FIG. 10 is a waveform diagram illustrative of another embodiment of correcting waveform signal used in the wide aspect television receiver of the invention.
Figure 11:
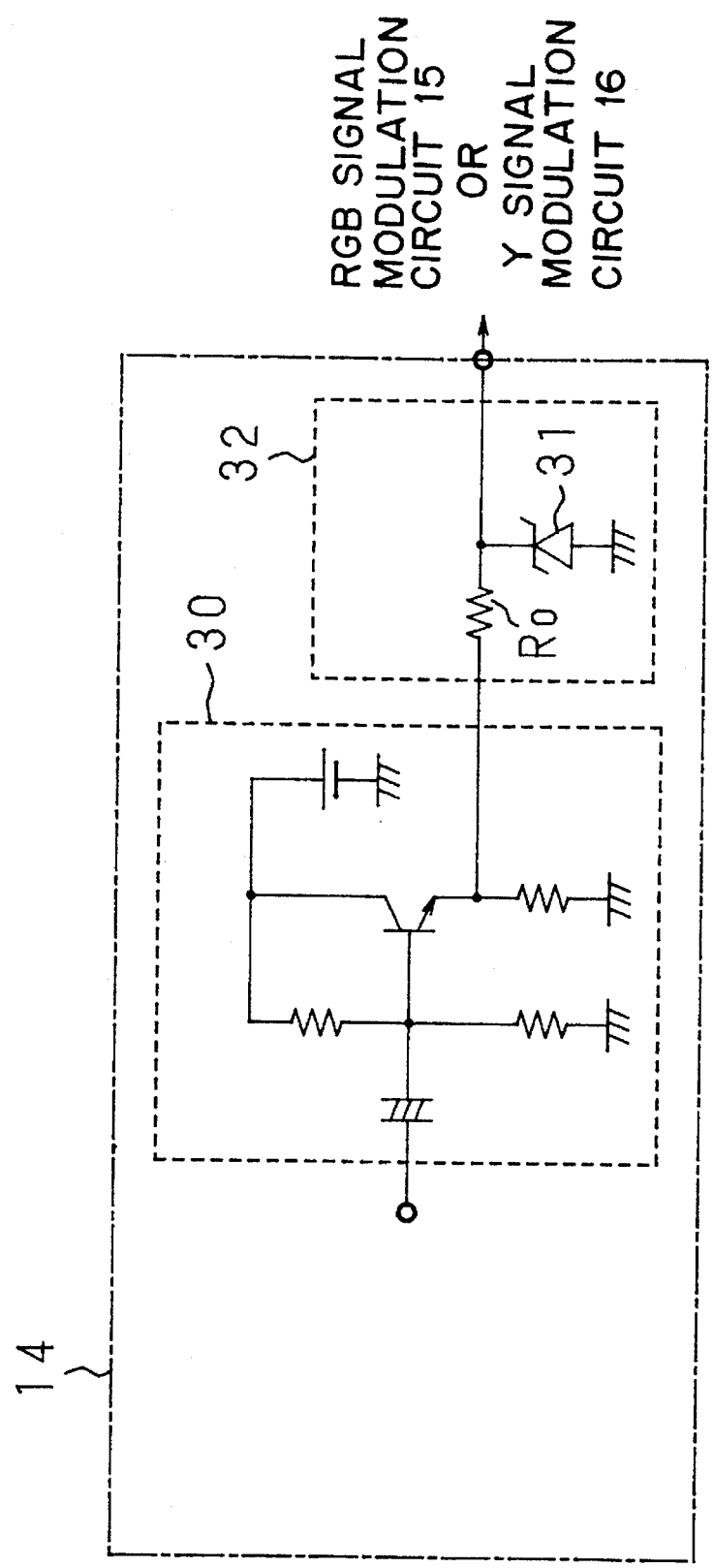
FIG. 11 is a circuit diagram illustrative of an embodiment of a correcting waveform signal generation circuit of the wide aspect television receiver of the invention.

The correcting waveform signal generation circuit 14 of this embodiment further clips the parabolic voltage (shown in FIG. 8B, for example) generated to modulate luminance, at a specified level, thereby to shape the waveform of gradually rising in the beginning and gradually falling at the end but flat in the middle with no change in the voltage, as shown in FIG. 10. FIG. 11 is a partial circuit diagram of the output side from the correcting waveform signal generation circuit $I_4$ to the RGB signal modulation circuit 15 or the Y signal modulation circuit 16, wherein the vertical scanning period parabolic voltage signal is input from the input terminal d to a bias circuit 30 of an emitter follower circuit, to which is connected a clip circuit 32 comprising a resistance $R_0$ and a zener diode 31.

In the correcting waveform signal generation circuit 14 of this embodiment, the emitter follower circuit (bias circuit 30) applies a bias voltage to the impressed parabolic voltage (shown in FIG. 8B, for example). By slicing the output signal voltage from the emitter follower circuit at a specified voltage level generated by flowing the required current with the resistance $R_0$ and the zener diode 31 of the clip circuit 32 in the timing with linearity contraction of the raster at the top and bottom in the vertical direction as shown in FIG. 6, thereby generating the correcting waveform shown in FIG. 10.

Assuming that the starting time of the vertical deflection as $t_1$, a period of contracting the vertical linearity at the top of the screen as $t_1$ through $t_2$, a period of proper linearity at the center of the screen as $t_2$ through $t_4$, and a period of contracting the vertical linearity at the bottom of the screen as $t_4$ through $t_5$ as shown in the right portion of FIG. 6, then such a correcting waveform corresponding to the linearity of each portion is generated in such timing that the correcting waveform gradually rises in the period $t_1$ through $t_2$, flat in the period $t_2$ through $t_4$ and gradually falls in the period $t_4$ through $t_5$ as shown in FIG. 10.

Embodiment 4

Figure 12:
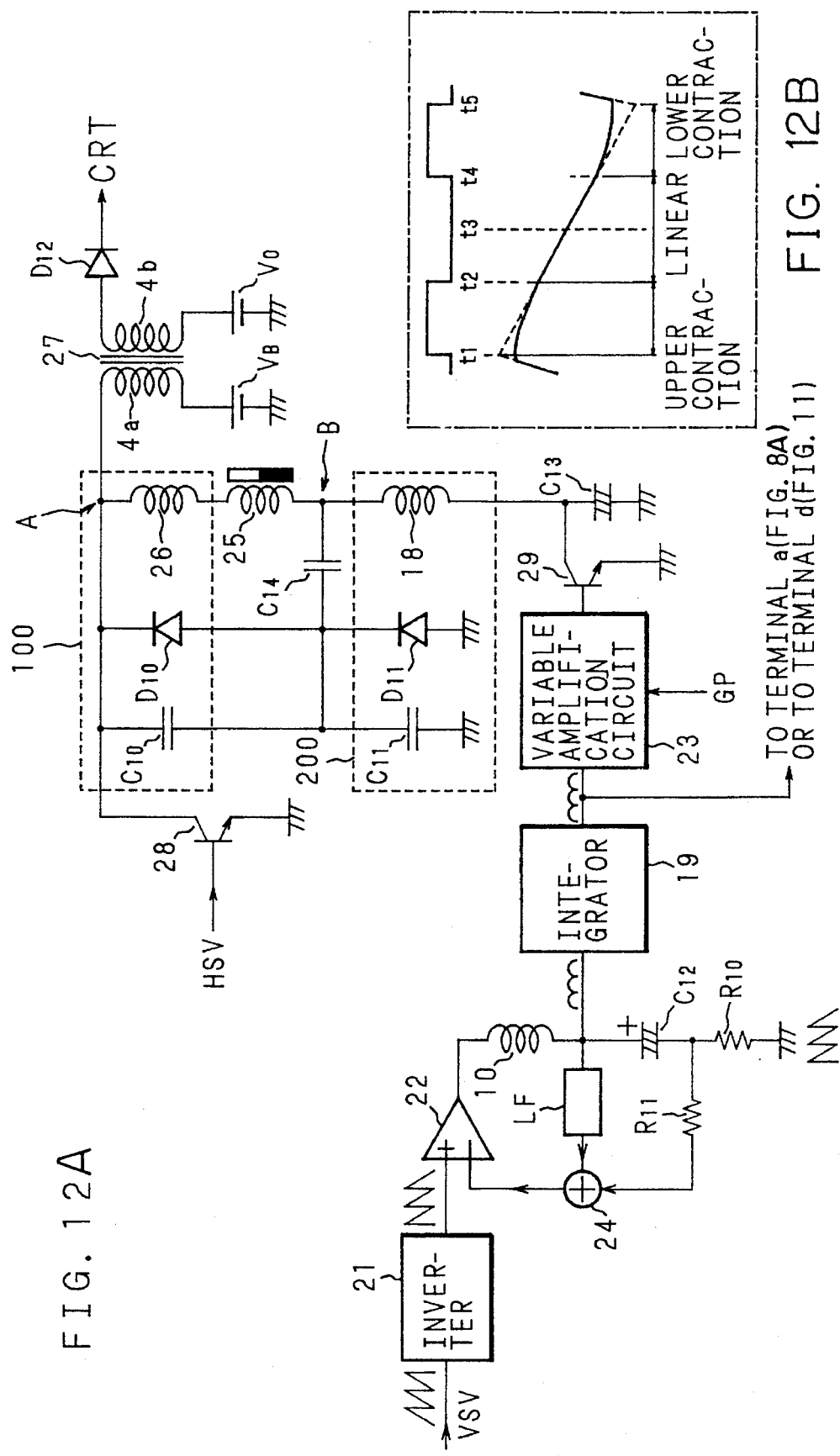
FIG. 12 is a waveform diagram of the gate pulse in the upper portion and of the vertical deflection current in the lower portion.
Figure 13:
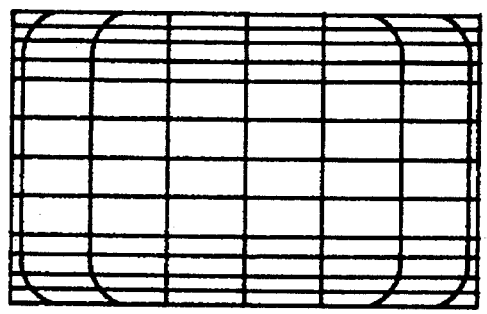
FIG. 13 shows a raster pattern in the presence of horizontal pincushion distortion in wide screen reproduction.

FIG. 12A is a block diagram of a pincushion distortion correction circuit which corrects the lateral pincushion distortion at the top and bottom of the screen, namely the distortion of the vertical lines at the top and bottom as shown in FIG. 13, and is included in the horizontal deflection system. The pincushion distortion at the right and left of the screen is corrected to compensate for the insufficient amplitude at the center of the screen by amplitude-modulating the horizontal deflection current with the parabolic current having parabolic waveform in one vertical scanning period. However, in wide screen reproduction, when the raster is contracted at only the top and bottom after simply broadening the vertical deflection width to be wider than that in the ordinary screen reproduction, the pincushion distortion at the right and left of the top and bottom of the screen where the raster is contracted is not properly corrected because contraction at the top and bottom results in a side effect of relatively strong influence of the horizontal deflection magnetic field on the top and bottom. Therefore, the pincushion distortion correction circuit of the invention corrects the over-correction of the lateral pincushion distortion at the top and bottom of the screen where the raster is contracted.

A drive pulse ($H_{SV}$) of a specified pulse length corresponding to a horizontal scanning period and synchronizing with a horizontal synchronizing signal is input to the base of an emitter-grounded horizontal output transistor 28. The collector of the horizontal output transistor 28 is connected to a positive electrode of a power source $V_B$ via a primary winding $4a$ of a flyback transformer 27, while a negative electrode of the power source $V_B$ is grounded. The collector of the horizontal output transistor 28 is grounded via a series circuit of a capacitor $C_{10}$ and a capacitor $C_{11}$. The collector of the horizontal output transistor 28 is also grounded via a series circuit of a diode $D_{10}$ of which cathode is connected to the collector of the horizontal output transistor 28 and a diode $D_{11}$ of which cathode is connected to the anode of the diode $D_{10}$.

The node of the capacitors $C_{10}$ and $C_{11}$ and the node of the diodes $D_{10}$ and $D_{11}$ are connected in common. One end of a secondary winding $4b$ of the flyback transformer 27 is connected to the anode of a diode $D_{12}$, and is connected to a secondary terminal of the CRT not shown in the drawing via the diode $D_{12}$. Another end of the secondary winding $4b$ is connected to a positive electrode of a power source $V_0$. The negative electrode of the power source $V_0$ is grounded.

A vertical deflection sawtooth voltage $V_{SV}$ is input to a positive input terminal (+) of a vertical output amplifier 22 via an inverter circuit 21. An output terminal of the vertical output amplifier 22 is grounded via a series circuit of the vertical deflection coil 10, the coupling capacitor $C_{12}$ and the resistance $R_{10}$. A quasi-parabolic voltage provided at the node of the vertical deflection coil 10 and the coupling capacitor $C_{12}$ is input either to an adder 24 via a low-pass filter LF or directly input to an integrator 19.

The sawtooth voltage at the node of the coupling capacitor $C_{12}$ and the resistance $R_{10}$ is input to the adder 24 via the resistance $R_{11}$. An output from the adder 24 is input to a negative input terminal (−) of the vertical output amplifier 22. A vertical scanning period parabolic voltage output from the integrator 19 is input to a variable amplification circuit 23 which has different gains in a period ($t_1$ through $t_2$, $t_4$ through $t_5$) during which, as shown in FIG. 12B, a gate pulse GP (enclosed by alternate dot and dash line of FIG. 12B) is at high level and in a period ($t_2$ through $t_4$) during which GP is at low level. The vertical scanning period parabolic voltage output from the integrator 19 is also output to the input terminal a of the RGB signal modulation circuit 15 shown in FIG. 8 or to the input terminal d of the correcting waveform signal generation circuit 14 shown in FIG. 11. The output voltage amplified by the variable amplification circuit 23 is input to the base of the emitter-grounded transistor 29 for the diode modulator. The collector of the transistor 29 is grounded via the capacitor $C_{13}$ and is connected to one end of the primary winding 4a of the flyback transformer 27 via a series circuit of a diode modulator coil 18, horizontal linearity coil 25 and a horizontal deflection coil 26.

The node of the diode modulator coil 18 and the horizontal linearity coil 25 is connected to a common node of the diodes $D_{10}$ and $D_{11}$ via the capacitor $C_{14}$. The capacitor $C_{10}$, the diode $D_{10}$ and the horizontal deflection coil 26 constitute a first resonance circuit 100, while the capacitor $C_{11}$, the diode $D_{11}$ and the diode modulator coil 18 constitute a second resonance circuit 200.

Now the operation of the pincushion distortion correction circuit will be described below.

The vertical deflection sawtooth voltage VSV input to the vertical output! amplifier 22 causes the quasi-parabolic voltages which is linear at the rising portion of the wave, to be generated at a positive terminal (+) of the coupling capacitor $C_{12}$, namely the node of the vertical deflection coil 10 and the coupling capacitor $C_{12}$. The quasi-parabolic voltage is input to the integrator 19 which integrates the input quasi-parabolic voltage to curve the linear portion and generates the parabolic voltage, while the parabolic voltage is input to the variable amplification circuit 23. When the vertical deflection current shown in FIG. 7C flows in the vertical deflection coil 10 at this time, the distortion on the right and left sides of the picture at the top and bottom of the screen is excessively corrected so that the vertical lines curve inward at the top and bottom of the screen as shown in FIG. 13 when displaying, for example, a cross pattern signal on the CRT.

This distortion is corrected in a process as will be described below. In the periods $t_1$ through $t_2$ and $t_4$ through $t_5$ in FIG. 6 when the vertical deflection width is contracted, namely in the periods when the vertical linearity is contracted at the top and bottom of the screen, the gain by the variable amplification circuit 23 is increased in a period during which the gate pulse GP, repeated by the vertical scanning cycle, is at high level indicated in an area enclosed by the alternate dot and dash line in FIG. 12B. By this operation, the difference in voltage level between the center and both sides of the parabolic wave, namely curvature of the parabolic wave, which is to be the reference wave of the pincushion distortion decreases, thereby corrects the over-correction of the distortion at the right and left of the screen. As a result, the inward curving of the picture at the top and bottom of the screen described previously is corrected.

The operation of avoiding the excessive pincushion distortion will be described below in more detail.

FIG. 12A shows the constitution of the horizontal pincushion distortion correction circuit of diode modulator type, wherein the horizontal output is separated by two diodes $D_{10}$ and $D_{11}$, and two loops where a sawtooth current of the horizontal scanning period flows are formed; the one loop connected to the first resonance circuit 100 comprising the capacitor $C_{10}$, the diode $D_{10}$ and the horizontal deflection coil 26 and the other loop connected to the second resonance circuit 200 comprising the capacitor $C_{11}$, the diode $D_{11}$ and the diode modulator coil 18. Because the collector of the diode modulator transistor 29 is connected to the diode modulator coil 18, the current flowing in the loop connected to the second resonance circuit 200 (lower loop) is controlled by the output signal from the variable amplification circuit 23, thereby causing the current flowing in the loop of the first resonance circuit 100 (upper loop) to be controlled.

This means that decreasing the current in the lower loop causes the current in the upper loop to increase. The output signal from the variable amplification circuit 23 is the parabolic signal whose curvature, namely the difference in voltage level between the center and both ends thereof is changed from that of the parabolic wave output from the integrator 19 due to the varying gains applied by the variable amplification circuit 23 upon receipt of the high level gate pulse GP in the periods $t_1$ through $t_2$ and $t_4$ through $t_5$ (FIG. 12B).

Figure 14A:
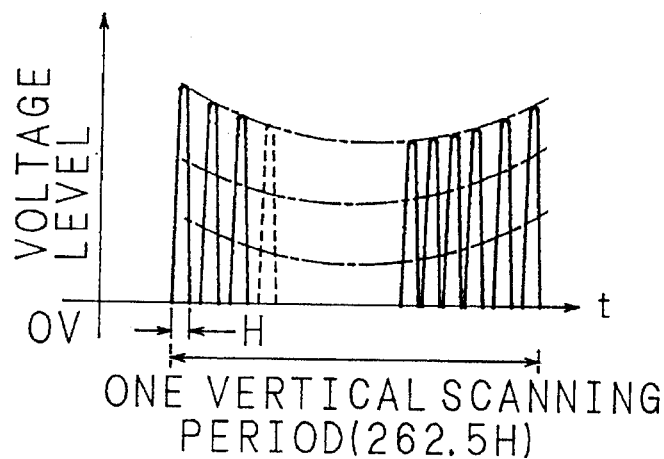
FIG. 14A shows an envelope curve of horizontal pulses (flyback pulses) at point B of the pincushion distortion correction circuit shown in FIG. 12A.

Because the diode modulator transistor 29 receives a signal from the variable amplification circuit 23, such a voltage wave to be inverted (inverted parabolic waveform) appears at a point B of FIG. 12A. FIG. 14A shows the waveform.

As shown in FIG. 14A, control of the horizontal width of the horizontal deflection is carried out by making a DC level of an output signal from the variable amplification circuit 23 adjustable and by changing the level of the envelope of the inverted parabolic wave at the point B. The middle dot-and-dash curve is the curve for a standard horizontal scanning width. The upper and lower dot-and-dash curves are the curves for narrower and wider horizontal scanning widths respectively. Each pulse is for one horizontal scanning period, while the envelope is for one vertical scanning period (262.5 horizontal scanning periods).

Figure 14B:
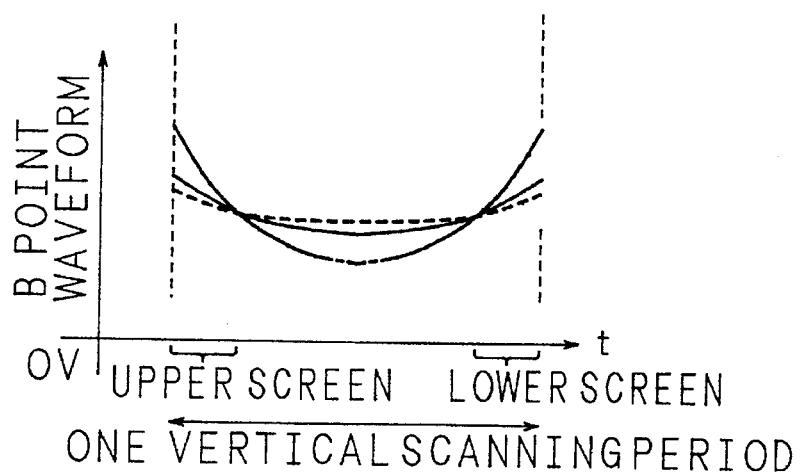
FIG. 14B is a diagram illustrative of the relationship between the amount of pincushion distortion correction and the envelope curve of the horizontal pulses at point B of the pincushion distortion correction circuit shown in FIG. 12A.

Envelopes of the voltage waveforms of the horizontal scanning pulses (flyback pulses) at the point B in FIG. 12 (hereinafter called the B point voltage waveform) are shown in FIG. 14B in the cases where the amount of correction for the pincushion distortion is excessive, as indicated by the dot-and-dash curve, proper, as indicated by the solid curve, or insufficient, as indicated by the dash curve, respectively. The envelope is from the upper screen to the lower screen along the horizontal axis and is for one vertical scanning period.

In case that the pincushion distortion correction circuit is not used, the excessive curvature of the B point voltage waveform in the periods corresponding to the top and bottom of the screen causes the horizontal deflection coil current in the periods to become too much greater than a specified value, thereby causing an over correction of the pincushion distortion in these periods. When the curvature of the B point voltage waveform in the periods corresponding to that portion is insufficient, on the contrary, the horizontal deflection coil current in the periods becomes too small, resulting in insufficient correction of the pincushion distortion in these periods. When the curvature of the B point voltage waveform in the periods corresponding to the top and bottom of the screen is appropriate, the horizontal deflection coil current in the periods becomes the specified value so that proper correction of the pincushion distortion is achieved in these periods.

The key point of the pincushion distortion circuit of this embodiment is that the curvature of the parabolic wave is made adjustable in limited portions of the top and bottom of the screen which require correction and, at the same time, the horizontal deflection width is made adjustable by changing the direct current level of the entire parabolic waveform. That is, the additional lateral distortion due to the nonlinear vertical deflection at the top and bottom of the screen is eliminated as well as the ordinary lateral pincushion distortion at the center of the screen.

Figure 14C:
FIG. 14C shows gate pulses GP supplied to a variable amplifier of the pincushion distortion correction circuit shown in FIG. 12A.

FIG. 14C shows dot pulses GP supplied to a variable amplifier 23.

Figure 14D:
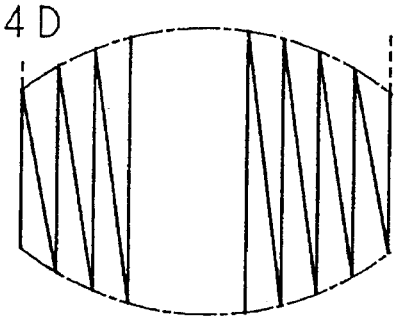
FIG. 14D shows an envelope curve of a current flowing in the horizontal deflection coil of the pincushion distortion correction circuit shown in FIG. 12A.

FIG. 14D shows the current flowing in the horizontal deflection coil 26 in correspondence to the B point voltage waveform, namely the standard waveform of the current flowing from a point A to the point B in FIG. 12A.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A wide aspect television receiver which generates video signals for a wide screen of a second aspect ratio from video signals for a screen of a first aspect ratio lower than the second aspect ratio, comprising:

deflection signal output means for outputting a linear deflection signal for electron beams;

deflection linearity correcting means for keeping the deflection signal to be linear at the center of the wide screen but for correcting the same to be nonlinear at the peripheral portions thereof, thereby to change the deflection width of the electron beam to be appropriate for the screen of the second aspect ratio;

correcting waveform signal generating means for generating a correcting signal for varying the voltage levels of the video signals in one scanning period to eliminate variations in the luminance between the center and the peripheral portion of the screen due to the correction by the deflection linearity correcting means; and video signal modulating means for amplitude-modulating the video signal with the correcting signal generated by the correcting waveform signal generating means.

2. The wide aspect television receiver as claimed in claim 1, further comprising:

pincushion distortion correcting means for correcting over-correction of pincushion distortion over-corrected by changing the deflection signal to be nonlinear by the deflection linearity correcting means.

3. The width aspect television receiver as claimed in claim 2, wherein said pincushion correcting means comprises an integrator receiving a voltage provided to a vertical deflection coil which vertically deflects electron beams in accordance with said deflection signal and outputting a parabolic wave, a variable amplification circuit receiving said parabolic wave and outputting a variably amplified voltage, horizontal modulating means, receiving said variably amplified voltage and a horizontal deflection current, for modulating said horizontal deflection current in accordance with said variably amplified voltage, and a horizontal deflection coil receiving the modulated horizontal deflection current, which horizontally deflects the electron beams.

4. The width aspect television receiver as claimed in claim 3, wherein said variable amplification circuit varies amplification in accordance with a gate pulse having a period of one vertical scan.

5. A wide aspect television receiver which generates video signals for a wide screen of a second aspect ratio from video signals for a screen of a first aspect ratio lower than the second aspect ratio, comprising:

vertical deflection signal output means for outputting a linear vertical deflection signal for electron beams;

a vertical deflection coil which vertically deflects the electron beams;

vertical oscillation circuit which oscillates a sawtooth wave for the vertical deflection coil;

vertical deflection linearity correcting means for keeping the linear vertical deflection signal to be linear at the center of the screen but for changing the same to be nonlinear at the top and bottom of the screen, which is arranged in a feedback loop to feed back a part of the deflection current supplied to the vertical deflection coil into the vertical oscillation circuit;

correcting waveform signal generating means for generating a correcting signal parabolic in one vertical scanning period thereby to change the voltage level of the video signal in the one scanning period in order to eliminate variations in the luminance between the center and the top and bottom portions of the screen due to the correction by the vertical deflection linearity correcting means; and RGB signal modulating means for amplitude-modulating RGB signals with the correcting signal generated by the correcting waveform signal generating means.

6. The wide aspect television receiver as claimed in claim 5, further comprising:

waveform shaping means for correcting the correcting waveform signal corresponding to the center of the screen to be flat with no change in the voltage, by clipping the voltage of the parabolic wave which amplitude-modulates the RGB signals for the center of the screen, at a specified voltage level.

7. The width aspect television receiver as claimed in claim 6, wherein said specified voltage level is generated by passing the voltage of the parabolic wave through a resistor and a zener diode.

8. A wide aspect television receiver which generates video signals for a wide screen of a second aspect ratio from video signals for a screen of a first aspect ratio lower than the second aspect ratio, comprising:

vertical deflection signal output means for outputting a linear vertical deflection signal for electron beams;

vertical deflection coil for vertically deflecting the electron beams;

vertical oscillation circuit to oscillate a sawtooth wave for the vertical deflection coil;

vertical deflection linearity correcting means for keeping the linear vertical deflection signal to the linear at the center of the screen but for changing the same to be nonlinear at the top and bottom of the screen, which is arranged in a feedback loop to feed back a part of the deflection current supplied to the vertical deflection coil into the vertical oscillation circuit;

correcting waveform signal generating means for generating a correcting signal parabolic in one vertical scanning period thereby to change the voltage level of the video signal in the one scanning period in order to eliminate variations in the luminance between the center and the top and bottom portions of the screen due to the correction by the vertical deflection linearity correcting means; and luminance signal modulating means for amplitude-modulating the luminance signals with the correcting signal generated by the correcting waveform signal generating means.

9. The wide aspect television receiver as claimed in claim 8, further comprising:

waveform shaping means for correcting the correcting waveform signal corresponding to the center of the screen to be flat with no change in the voltage, by clipping the voltage of the parabolic wave which amplitude-modulates RGB signals for the center of the screen, at a specified level.

10. The width aspect television receiver as claimed in claim 9, wherein said specified voltage level is generated by passing the voltage of the parabolic wave through a resistor and a zener diode.

11. A wide aspect television receiver which generates video signals for a wide screen of a second aspect ratio from video signals for a screen of a first aspect ratio lower than the second aspect ratio, comprising:

vertical deflection signal output means for outputting a linear vertical deflection signal for electron beams;

vertical deflection linearity correcting means for keeping the linear vertical deflection signal to be linear at the center of the wide screen but for correcting the same to be a nonlinear at the peripheral portions thereof, thereby to change the deflection width of the electron beam to [a]be appropriate for the screen of the second aspect ratio;

correcting waveform signal generating means for generating a correcting signal parabolic in one vertical scanning period thereby to change the voltage level of a video signal in the one vertical scanning period in order to eliminate variations in the luminance between the center and the top and bottom portions of the screen due to the correction by the vertical deflection linearity correcting means; and means for correcting horizontal pincushion distortion, which comprises;

means for generating a horizontal pincushion distortion correcting signal to correct lateral pincushion distortion resulting from scanning the electron beams with the linear vertical deflection signals, variable amplification means for changing the pincushion distortion correcting signal to such a signal that corrects the over-correction of the lateral pincushion distortion at the top and bottom of the screen, the over-correction which occurs due to the vertical deflection linearity correcting means that changes the vertical deflection signal to be nonlinear by changing a gain of the horizontal pincushion distortion correcting signal according to the position on the screen, impedance adjusting means for changing impedance of a horizontal deflection circuit which outputs a horizontal deflection current responsive to the signal from the variable amplification means, and horizontal deflection current control means for controlling the horizontal deflection current output from the horizontal deflection circuit with the impedance determined by the impedance adjusting means.

12. A method for generating video signals for a wide screen of a second aspect ratio from video signals for a screen of a first aspect ratio lower than the second aspect ratio, comprising the steps of:

outputting a deflection signal for electron beams;

linearity correcting the deflection signal to be linear at the center of the wide screen and to be nonlinear at the peripheral portions of the wide screen, thereby changing the deflection width of the electron beam to be appropriate for the screen of the second aspect ratio;

generating a correcting signal for varying the voltage levels of the video signals in one scanning period to eliminate variations in the luminance between the center and the peripheral portion of the screen due to the correcting by the linearity correcting step; and amplitude-modulating the video signal with the correcting signal from the generating step.

13. The method as claimed in claim 12, further comprising:

correcting over-correction of pincushion distortion over-corrected by changing the deflection signal to be a nonlinear by the deflection linearity correcting means.

14. A method for generating video signals for a wide screen of a second aspect ratio from video signals for a screen of a first aspect ratio lower than the second aspect ratio, comprising the steps of:

outputting a vertical deflection signal for electron beams;

vertically deflecting the electron beams using a vertical deflecting coil;

oscillating a sawtooth deflection current for the vertical deflecting coil;

linearity correcting the vertical deflection signal to be linear at the center of the screen;

changing the vertical deflection signal to be nonlinear at the top and bottom of the screen;

feeding back a part of the deflection current supplied to the vertical deflecting coil to the oscillating step;

generating a correcting signal parabolic in one vertical scanning period thereby changing the voltage level of the video signal in the one vertical scanning period in order to eliminate variations in the luminance between the center and the top and bottom portions of the screen due to the correction by the linearity correcting and the changing steps; and amplitude-modulating RGB signals with the correcting signal generated by the generating step.

15. The method as claimed in claim 14, further comprising:

correcting the correcting signal corresponding to the center of the screen to be flat with no change in the voltage, by clipping the voltage of the parabolic wave which amplitude-modulates the RGB signals for the center of the screen, at a specified voltage level.

16. A method for generating video signals for a wide screen of a second aspect ratio from video signals for a wide screen of a second aspect ratio from video signals for a screen of a first aspect ratio lower than the second aspect ratio, comprising the steps of outputting a vertical deflection signal for electron beams;

vertically deflecting the electron beams using a vertical deflection coil;

oscillating a sawtooth deflection current for the vertical deflection coil;

linearity correcting the vertical deflection signal to be linear at the center of the screen;

changing the vertically deflection signal to be nonlinear at the top and bottom of the screen;

feeding back a part of the deflection current supplied to the vertical deflection coil into the oscillating step;

generating a correcting signal parabolic in one vertical scanning period thereby changing the voltage level of the video signal in the one vertical scanning period in order to eliminate variations in the luminance between the center and the top and bottom portions of the screen due to the correction by the linearity correcting and changing steps; and modulating the luminance signals with the correcting signal generated by the generating step.

17. The method as claimed in claim 16, further comprising:

correcting the correcting signal corresponding to the center of the screen to be flat with no change in the voltage, by clipping the voltage of the parabolic wave which amplitude-modulates RGB signals for the center of the screen, at a specified level.

18. A method for generating video signals for a wide screen of a second aspect ratio from video signals for a screen of a first aspect ratio lower than the second aspect ratio, comprising the steps of:

outputting a linear vertical deflection signal for electron beams;

linearity correcting the vertical deflection signal to be linear at the center of the wide screen and correcting the vertical deflection signal to be nonlinear at the peripheral portions of the screen, thereby changing the deflection width of the electron beam to be appropriate for the screen of the second aspect ratio;

generating a correcting signal parabolic in one vertical scanning period thereby to change the voltage level of the video signal in the one vertical scanning period in order to eliminate variations in the luminance between the center and the top and bottom portions of the screen due to the correction by the linearity correcting step; and correcting horizontal pincushion distortion, comprising the steps of;

generating a horizontal pincushion distortion correcting signal to correct lateral pincushion distortion result from scanning the electron beams with the vertical deflection signal, changing the pincushion distortion correcting signal to such a signal that corrects the over-correction of the lateral pincushion distortion at the top and bottom of the screen, the over-correction which occurs due to the linearity correcting step that changes the vertical deflection signal to be nonlinear by changing a gain of the horizontal pincushion distortion correcting signal according to the position on the screen, changing impedance of a horizontal deflection circuit that outputs a horizontal deflection current responsive to the signal from changing the pincushion distortion correction signal step, and controlling the horizontal deflection current output from the horizontal deflection circuit with the impedance determined by the changing impedance step.

* * * * *